United States Patent
Hofmann et al.

(10) Patent No.: US 9,004,215 B2
(45) Date of Patent: Apr. 14, 2015

(54) COUPLING ARRANGEMENT AND COUPLING ELEMENT

(71) Applicant: Hirschvogel Umformtechnik GmbH, Denklingen (DE)

(72) Inventors: Tobias Hofmann, Stoettwang (DE); Stephan Lutzenberger, Peiting (DE); Christian Seel, Utting-Holzhausen (DE); Stephan Weidel, Buchloe (DE)

(73) Assignee: Hirschvogel Umformtechnik GmbH, Denklingen (DE)

( * ) Notice: Subject to any disclaimer, the term of this patent is extended or adjusted under 35 U.S.C. 154(b) by 49 days.

(21) Appl. No.: 13/901,313

(22) Filed: May 23, 2013

(65) Prior Publication Data

US 2014/0054954 A1    Feb. 27, 2014

(30) Foreign Application Priority Data

Aug. 22, 2012    (DE) .......................... 10 2012 214 884

(51) Int. Cl.
*F16D 1/108*    (2006.01)
*F16D 1/112*    (2006.01)
*B60B 27/06*    (2006.01)
(Continued)

(52) U.S. Cl.
CPC .......... *B60B 27/065* (2013.01); *Y10T 403/7045* (2015.01); *F16D 1/108* (2013.01); *F16D 1/112* (2013.01); *F16D 1/076* (2013.01); *F16D 2003/22326* (2013.01); *B60B 27/0005* (2013.01);
(Continued)

(58) Field of Classification Search
CPC ...... F16D 1/108; F16D 1/112; B60B 27/0031

USPC ........ 280/93.512, 93.513; 180/252, 255, 260, 180/261, 262; 301/111.01, 111.03
See application file for complete search history.

(56) References Cited

U.S. PATENT DOCUMENTS 4,047,770 A * 9/1977 Korenhof et al. ............. 384/482
4,460,058 A 7/1984 Welschof et al.
(Continued)

FOREIGN PATENT DOCUMENTS

DE    3116720 C1    10/1982
DE    102005054283 A1    5/2007

OTHER PUBLICATIONS

Voith Turbo, "Voith Hirth Couplings, Standard and Custom-Made Toothed Rings", 2007, 10 pages.
(Continued)

*Primary Examiner* — Drew Brown
*Assistant Examiner* — Barry Gooden, Jr.
(74) *Attorney, Agent, or Firm* — Marshall, Gerstein & Borun LLP (57) ABSTRACT

A coupling arrangement having a rotational axis, about which the coupling arrangement can rotate, having: a first coupling element with an axially-extending flat-side spur toothing system having radially extending first teeth, a second coupling element with an axially-extending flat-side corresponding toothing system which engages axially into the spur toothing system and has radially-extending second teeth, and at least one means for bracing the first coupling element axially with the second coupling element, which coupling elements are fixedly connected fixedly to one another to rotate together about the rotational axis via the toothing systems to transmit torque. The teeth of at least one of the toothing systems have tooth tip lines that are curved convexly in the axial direction away from a tooth root.

23 Claims, 6 Drawing Sheets

(51) Int. Cl.
*F16D 1/076* (2006.01)
*F16D 3/223* (2011.01)
*B60B 27/00* (2006.01)

(52) U.S. Cl.
CPC ......... *B60B 27/0031* (2013.01); *B60B 27/0036* (2013.01)

(56) References Cited

U.S. PATENT DOCUMENTS

| | | | |
|---|---|---|---|
| 4,893,960 A * | 1/1990 | Beier et al. | 403/24 |
| 5,806,936 A * | 9/1998 | Guimbretiere | 301/105.1 |
| 6,193,320 B1 * | 2/2001 | Weiss | 301/35.63 |
| 7,597,405 B2 * | 10/2009 | Langer et al. | 301/105.1 |
| 7,857,520 B2 * | 12/2010 | Langer et al. | 384/544 |
| 8,025,579 B2 * | 9/2011 | Kamikawa et al. | 464/178 |
| 8,066,337 B2 * | 11/2011 | Tsuzaki et al. | 301/105.1 |
| 8,205,578 B2 | 6/2012 | Curry et al. | |
| 8,353,775 B2 * | 1/2013 | Kamikawa et al. | 464/7 |
| 8,444,322 B2 * | 5/2013 | Langer et al. | 384/544 |
| 8,512,157 B2 * | 8/2013 | Harada et al. | 464/178 |
| 2008/0193071 A1 * | 8/2008 | Langer et al. | 384/544 |
| 2009/0108668 A1 * | 4/2009 | Kamikawa et al. | 301/109 |
| 2013/0053155 A1 * | 2/2013 | Watanabe et al. | 464/157 |

OTHER PUBLICATIONS

Voith Turbo, "Hirth Serration, Hirth Coupling", 2008, 8 pages.
Publication of Geomess, retrived from the internet on Nov. 26, 2014, 2 pages.

* cited by examiner

COUPLING ARRANGEMENT AND COUPLING ELEMENT

BACKGROUND OF THE INVENTION

1. Field of the Invention

The present invention relates to a coupling arrangement, such as a wheel hub/pivot axle arrangement, and to a coupling element with a spur toothing system, such as a wheel hub or a pivot axle.

2. Related Technology

Coupling arrangements are known from the prior art which have, in particular, a wheel hub and a constant velocity rotary joint as coupling elements which are connected fixedly to one another so as to rotate together. For the rotationally fixed connection of the two coupling elements and therefore for the transmission of torque about a common rotational axis, the two coupling elements in each case have a spur toothing system and corresponding toothing system, respectively, which extends axially with regard to the rotational axis, which toothing systems are in engagement with one another. The two coupling elements are braced axially by means of a bracing means, such as a bolt, in order to maintain the rotationally fixed gearwheel connection.

For example, DE 31 16 720 C1 discloses a coupling arrangement of this type, the end side of the constant velocity rotary joint being of disk-shaped configuration and the corresponding face of the wheel hub being configured in such a way that, during mounting, the toothing system first of all bears against the external diameter and only subsequently, as a consequence of elastic deformation, against the end side on the entire tooth flank. An identical refinement to the refinement of DE 31 16 720 C1 is also disclosed by DE 10 2005 054 283 A1.

Figure 3A:
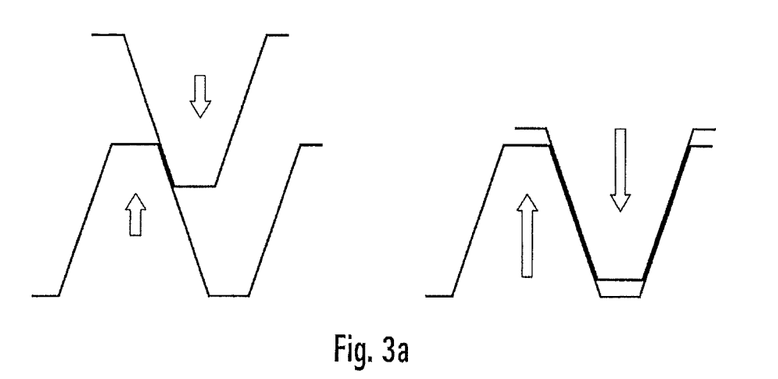
FIG. 3a shows a diagrammatic illustration of the assembly of known coupling elements.
Figure 3B:
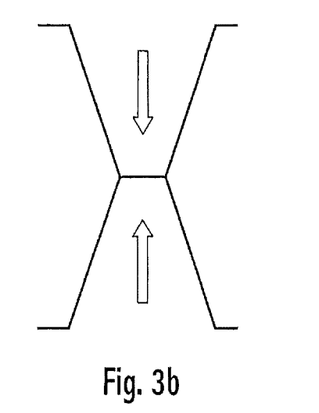
FIG. 3b shows a diagrammatic illustration of a typical faulty assembly of known coupling elements.

It has proven disadvantageous in all known coupling arrangements that the toothing system is as a rule not visible during mounting and therefore faulty assembly, in which the teeth of the first coupling element lie precisely on those of the second coupling element, cannot be detected reliably. If, during assembly of the two coupling elements, the teeth are offset with respect to one another in the rotational direction about the rotational axis, the teeth of the two coupling elements slide into one another along the two flanks thereof as a rule and therefore pass into the desired engagement (cf. FIG. 3a). In the case in which the tooth tips of the teeth of the two coupling elements lie precisely opposite one another during installation, they come into contact with one another on the end side and lie on one another tooth on tooth (cf. FIG. 3b). If the coupling elements are braced with one another in this faulty assembly position, they can firstly transmit substantially no torque, and secondly there is the risk that the teeth strike one another because of a lack of a rotationally fixed engagement and, as a result, are destroyed.

SUMMARY OF THE INVENTION

It is therefore an object of the invention to provide a coupling arrangement and a coupling element which make reliable and simple installation of the components possible, that is to say engagement of the toothing systems with one another.

According to a first aspect, the invention relates to a coupling arrangement having a rotational axis, about which the coupling arrangement can rotate. The coupling arrangement has: a first coupling element with a flat-side spur toothing system which extends axially with regard to the rotational axis and has first teeth which extend radially with respect to the rotational axis, a second coupling element with a flat-side corresponding toothing system which extends axially with regard to the rotational axis, and engages axially into the spur toothing system and has second teeth which extend radially with respect to the rotational axis, and at least one bracing means for bracing the first coupling element axially with the second coupling element, which coupling elements are connected fixedly to one another so as to rotate together about the rotational axis via the spur toothing system and the corresponding toothing system in order to transmit a torque. At least one of the spur toothing system or the corresponding toothing system is configured in such a way that its teeth have tooth tip lines which are curved convexly in the axial direction away from the (respective) tooth root.

During the assembly of the two coupling components, that is to say when their toothing systems are to be brought into engagement, the curved tooth tip lines cause the tooth tips which are curved in the radial direction with regard to the rotational axis to project in the axial direction. As a consequence, first of all the regions of the tooth tips which have the highest axial extent pass one another. Since these are comparatively small regions of the tooth tips, it can be reliably avoided that the teeth lie on top of one another. In addition, in particular in the case of planar tooth flanks, the case results automatically where the curved tooth tip is configured to be narrowest with regard to the rotational axis at its highest axial extent as viewed in the circumferential direction of the coupling element. This in turn leads to rounder or more acute tooth tips, in particular in the region of the highest extent, with the result that it can be reliably avoided precisely in this region that the teeth of the two coupling elements lie on top of one another. At its highest axial extent, the tooth tip lines of the curved tooth tip can be at a smaller spacing from tooth root lines of the toothing system which lies opposite than radially on the outside and inside of the highest axial extent. As viewed in the radial direction with regard to the rotational axis, the curved tooth tip preferably has its highest extent in the axial direction between the radially outermost region and the radially innermost region of the tooth tip, particularly preferably in the center of the tooth as viewed in the radial direction. The points of the highest axial extent and/or the narrowest locations of at least two adjacent tooth tips are preferably at a different radial spacing from the rotational axis. An imaginary connection between the points of the highest axial extent and/or the narrowest locations of all the tooth tips runs, with regard to the rotational axis, preferably periodically, particularly preferably sinusoidally or in a wave-shaped manner and, furthermore, particularly preferably has a tulip shape or star shape (in the plan view of the toothing system). The spur toothing system and the corresponding toothing system are preferably of diametrically opposed design for uniform engagement of the teeth and therefore a long service life of the toothing system.

The first coupling element is preferably a wheel hub and the second coupling element is preferably a rotary joint. In this case, the wheel hub preferably has a wheel flange for connection of a wheel and a sleeve section for receiving a wheel mounting. The sleeve section then has the spur toothing system at its end which faces the rotary joint. The sleeve section is preferably configured integrally with an inner bearing ring of a bearing (preferably of a ball bearing) for the rotatable connection of the wheel hub to the wheel mounting, or, as an alternative, serves to receive an inner bearing ring of a ball bearing of this type. The rotary joint is preferably a constant velocity rotary joint which has a joint outer part, joint inner part and torque-transmitting elements, the joint outer part having the corresponding toothing system at its end which faces the wheel hub.

The bracing means is preferably supported axially on one side on the first coupling element (preferably on the wheel hub) and on the other side on the second coupling element (preferably the joint outer part). The second coupling element (preferably the joint outer part) can have a central threaded bore, into which the bracing means engages, the bracing means preferably being a threaded bolt, particularly preferably a hollow screw, which is inserted into a central bore of the first coupling element (preferably of the wheel hub) and is screwed into the threaded bore of the second coupling element and, in the screwed-in state, is supported axially on a radial supporting face of the first coupling element.

As mentioned at the outset, the invention also relates to the coupling element itself. Therefore, according to a second aspect, the invention also relates to a coupling element having a rotational axis, about which the coupling element can rotate, having a flat-side spur toothing system which extends axially with regard to the rotational axis and is designed in such a way that it can engage into a flat-side corresponding toothing system of a second coupling element in order to transmit a torque about the rotational axis and that the first coupling element can be connected with the second coupling element fixedly so as to rotate with one another. The spur toothing system of the coupling element is configured in such a way that its teeth which extend radially with respect to the rotational axis have tooth tip lines which are curved convexly in the axial direction away from the tooth root. Otherwise, the teeth can advantageously be developed as has already been described above with regard to the first aspect of the invention. The coupling element is preferably a wheel hub or a rotary joint of a coupling arrangement, in particular of the coupling arrangement according to the invention.

BRIEF DESCRIPTION OF THE DRAWINGS

Further advantages, refinements and developments of the invention will be described in the following text using the drawings of the accompanying figures, in which:

FIG. 4b shows a plan view of a blank for a coupling element according to FIG. 4a.

DETAILED DESCRIPTION

Figure 2A:
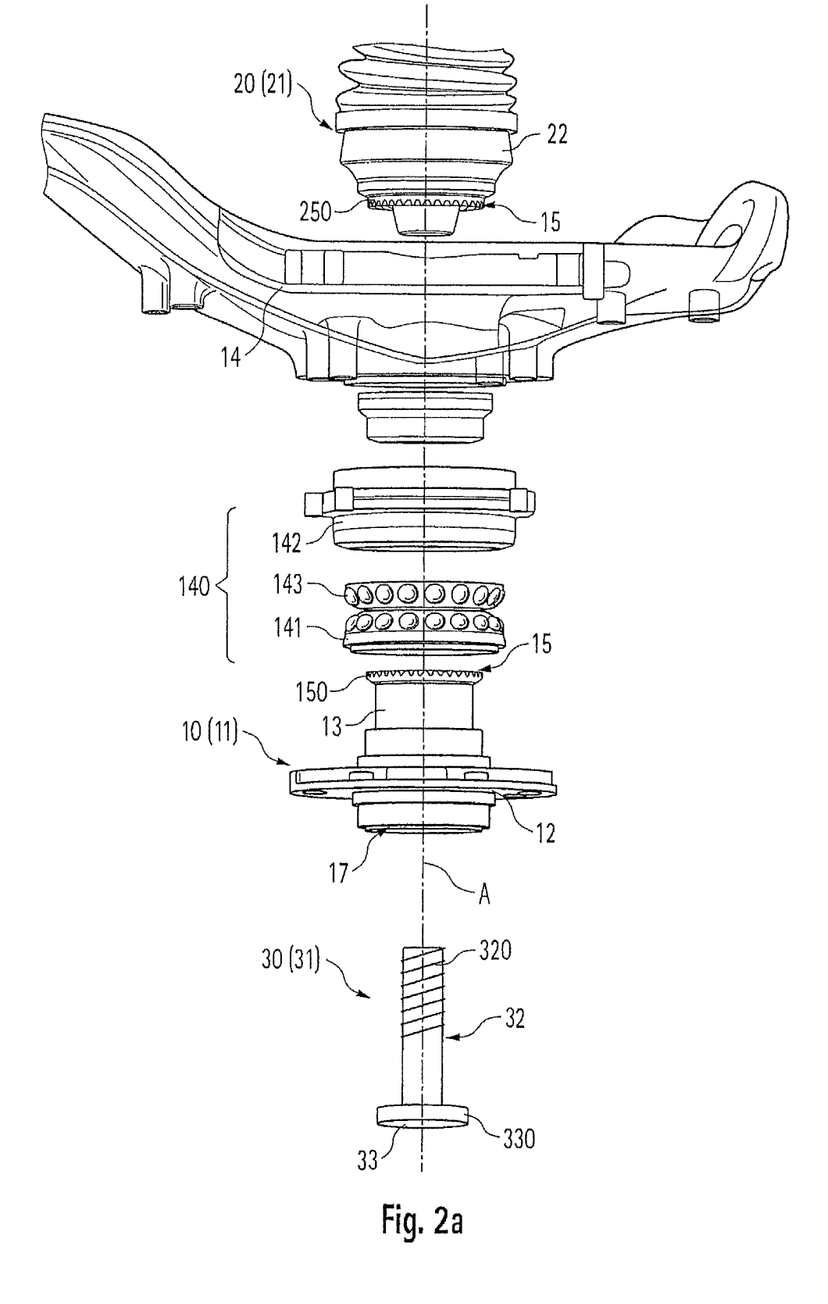
FIG. 2a shows in general an exploded illustration of a coupling arrangement.

FIG. 2a shows, by way of example, in general a coupling arrangement 1 as can also be provided in principle according to the invention. A coupling arrangement 1 of this type has a rotational axis A, about which the coupling arrangement 1 can rotate.

Furthermore, the coupling arrangement 1 has a first coupling element 10. The first coupling element 10 is preferably configured as a wheel hub 11. The wheel hub 11 preferably has a wheel flange 12 for connecting a wheel (not shown) and a sleeve section 13 for receiving a wheel mounting 14. To this end, the sleeve section 13 is preferably configured integrally with an inner bearing ring of a bearing 140 for the rotatable connection of the wheel hub 11 to the wheel mounting 14. As an alternative, as shown in FIG. 2a, the sleeve section 13 can serve for the rotationally fixed receiving of an inner bearing ring 141 of the bearing 140. Furthermore, the bearing 140 preferably has an outer bearing ring 142 which is in turn connected in a rotationally fixed manner to the wheel mounting 14, rolling bodies 143 preferably being provided for the rotatable connection between the inner bearing ring 141 and the outer bearing ring 142, which rolling bodies 143 run on raceways of the respective bearing ring 141, 142. The bearing 140 is preferably configured as a two-row angular contact ball bearing, as shown in FIG. 2a.

The first coupling element 10 has a flat-side spur toothing system 15 which extends axially with regard to the rotational axis A and has first teeth 150.

Furthermore, the coupling arrangement 1 has a second coupling element 20. In a corresponding manner to the first coupling element 10, the second coupling element 20 also has a flat-side spur toothing system which extends axially with regard to the rotational axis A, in the form of a corresponding toothing system 25 with second teeth 250, which corresponding toothing system 25 engages axially into the spur toothing system 15 of the first coupling element 10. The spur toothing system 15 and the corresponding toothing system 25 are preferably of diametrically opposed design. The first teeth 150 and the second teeth 250 preferably run radially with respect to the rotational axis A.

Figure 2B:
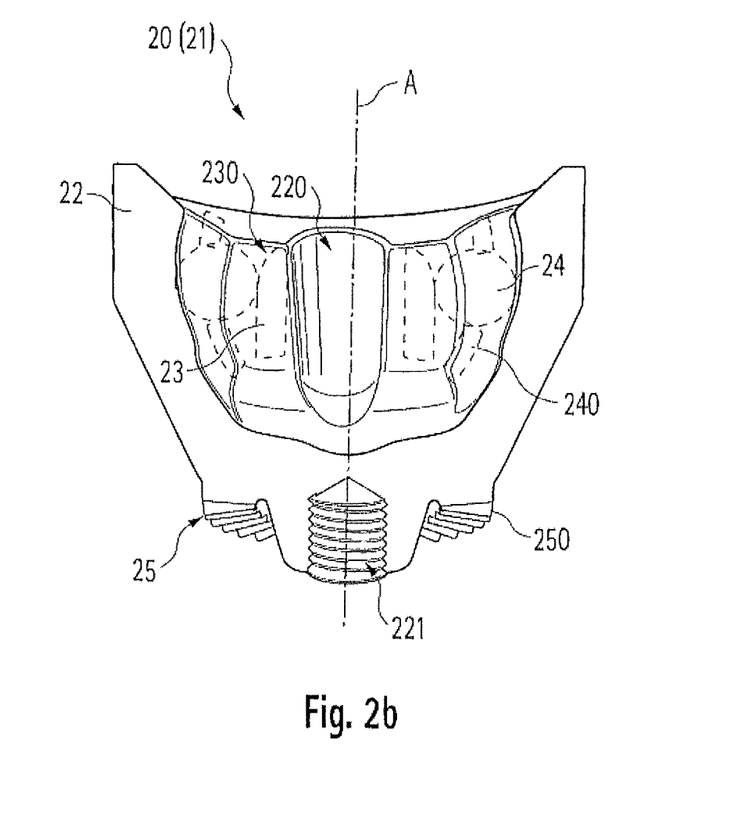
FIG. 2b shows in general a perspective, lateral sectional view of a joint outer part of a constant velocity rotary joint (that is to say of the second coupling element)

The second coupling arrangement 20 is preferably configured as a rotary joint 21, particularly preferably as a constant velocity rotary joint. The constant velocity rotary joint 21 preferably has a joint outer part 22 with outer ball tracks 220, a joint inner part 23 with inner ball tracks 230 (in each case shown diagrammatically), and torque-transmitting elements 24, preferably balls, which are arranged in each case in a pair comprising an outer ball track 220 and an inner ball track 230, and a cage 240 which holds the torque-transmitting elements 24 (shown diagrammatically in each case).

If the first coupling element 10 is configured as a wheel hub 11, the sleeve section 13 preferably has the spur toothing system 15 at its end which faces the second coupling element 20 or rotary joint 21. If the second coupling element is then configured as a rotary joint 21, the joint outer part 22 has the corresponding toothing system 25 at its end which faces the wheel hub 11, which toothing systems are brought into engagement as a result for the rotationally fixed connection of the first coupling element 10 and the second coupling element 20.

Furthermore, the coupling element 1 has at least one bracing means 30 for axially bracing the first coupling element 10 with the second coupling element 20, which coupling elements 10, 20 are connected fixedly to one another so as to rotate together via the spur toothing system 15 and the corresponding toothing system 25 in order to transmit torque about the rotational axis A. The bracing means 30 is preferably supported axially on one side on the first coupling element 10, that is to say preferably the wheel hub 11, and on the other side on the second coupling element 20, that is to say preferably the joint outer part 22 of the (constant velocity) rotary joint 21. To this end, the second coupling element 20, that is to say preferably the joint outer part 22, has, in particular, a central threaded bore 221, into which the bracing means 30 engages. The bracing means 30 is then preferably configured as a threaded bolt 31, particularly preferably as a hollow screw: that is to say, it has a threaded shank 32 with an external thread 320, which threaded shank 32 preferably corresponds with the threaded bore 221 in the sense of a non-positive connection. The threaded bolt 31 or the bracing means 30 is preferably inserted into a central (continuous) bore 16 of the first coupling element 10, preferably of the wheel hub 11, and is screwed into the threaded bore 221 of the second coupling element 20. Furthermore, the bracing means 30 is configured in such a way that, in the screwed-in state, it is supported axially on a radial supporting face 17 of the first coupling element 10. To this end, the bracing means 30 preferably has an annular flange 330 which has a greater diameter than the central bore 16 and is supported on the supporting face 17 with the regions which engage over the central bore 16. The annular flange 330 is preferably formed by a screw or bolt head 33 of the bracing means 30.

An abovementioned coupling arrangement 1 with a braced wheel hub 11 and (constant velocity) rotary joint 21 is also called a wheel hub/rotary joint arrangement.

Figure 1:
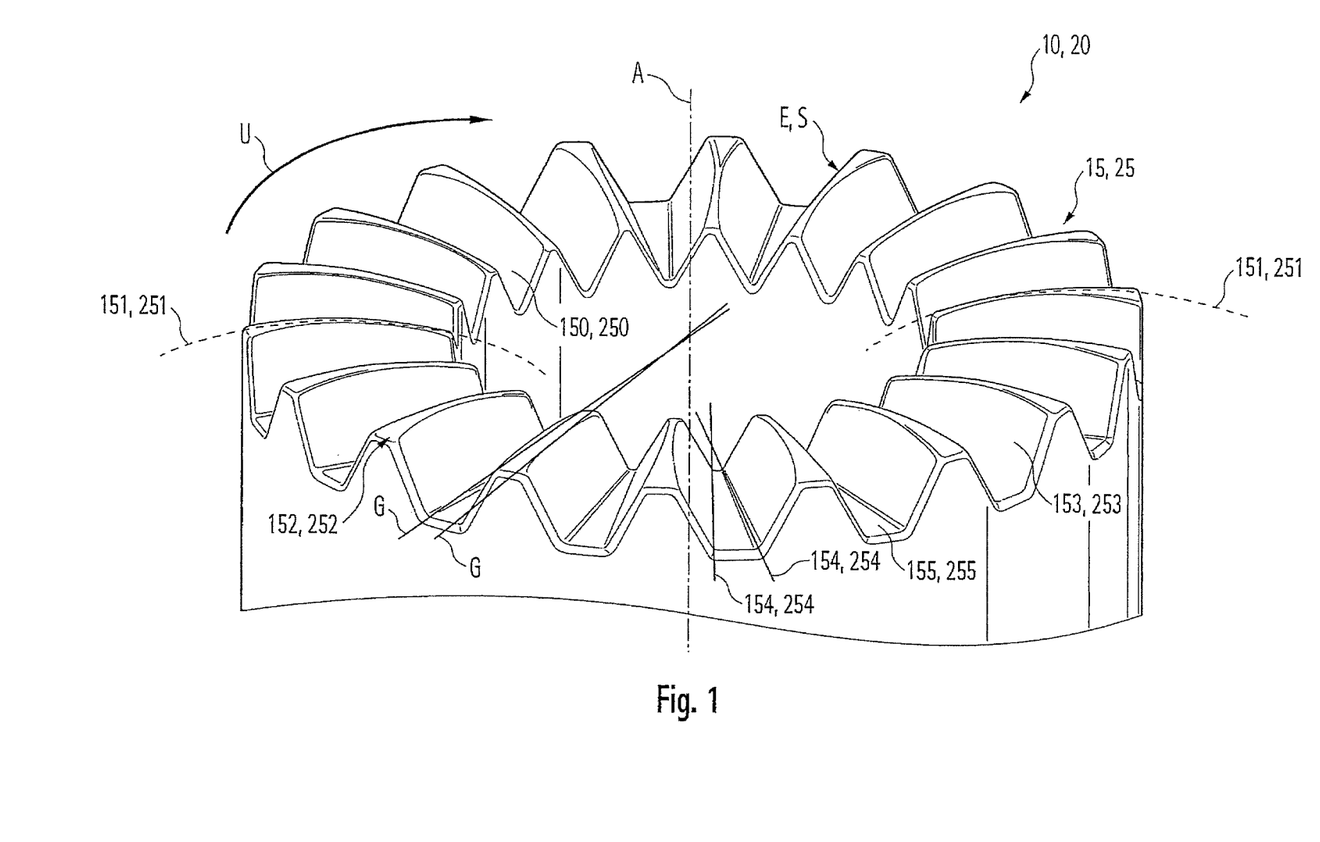
FIG. 1 shows a perspective view of a detail of a coupling element according to the invention.

With reference to FIG. 1, according to the invention, at least one of the spur toothing system 15 or the corresponding toothing system 25, or both, is/are configured in such a way that the teeth thereof 150, 250 have tooth tip lines 151, 251 which are curved convexly in the axial direction (and) away from the respective preferably likewise radially extending tooth root 155, 255 of the corresponding tooth 150, 250. The resultant, exposed, highest axial extent E of the tooth 150, 250 in the axial direction therefore represents a comparatively small region, that is to say a small bearing face/width transversely with respect to the tooth tip line 151, 251 and with respect to the rotational axis A, which region can come into front-side contact with the tooth 250, 150, lying opposite, of the other coupling element 20, 10. In this way, it is aided that the teeth 150, 250, lying opposite one another, of the installed coupling elements 10, 20 slide reliably past one another in the engagement of the toothing systems 15, 25 with one another and the tooth tips thereof 152, 252 do not accidentally come to lie on one another, with the result that faulty assembly as a result of tooth tips 152, 252 which lie on one another is avoided reliably.

The curved tooth 150, 250 or the tooth tip 152, 252 of the tooth 150, 250 preferably has its highest extent E in the axial direction, that is to say its highest axial extent E, as viewed in the radial direction, between the radially outermost region and the radially innermost region of the tooth tip 152, 252, particularly preferably in the center of the tooth 150, 250.

Furthermore, the curved tooth 150, 250 or tooth tip 152, 252 can be configured to be narrowest (S) at its highest axial extent E as viewed in the circumferential direction U of the coupling element 10, 20 with regard to the rotational axis A, that is to say can have its narrowest location (S) there (preferably substantially transversely with respect to the radial extent of the tooth 150, 250). This is preferably achieved simply and automatically by virtue of the fact that the tooth tip lines 151, 251 are of curved configuration. If the tooth flanks 153, 253 are of planar configuration here, that is to say they extend in each case in one plane (the two planes of the tooth flanks 153, 253 of a tooth 150, 250 preferably being inclined with respect to one another, in order to form the tooth geometry), the tooth flanks 153, 253 which are inclined with respect to one another run in the direction of the tooth tip 152, 252 toward one another the more as viewed in the circumferential direction U of the coupling element 10, 20 with regard to the rotational axis A, the further the tooth tip 152, 252 (or its tooth tip lines 151, 251) extends in the axial direction away from the coupling element 10, 20 or the (corresponding) tooth root 155, 255. As a result, as viewed in the circumferential direction U of the coupling element 10, 20 with regard to its rotational axis A, the tooth tip 152, 252 is of narrower configuration the further the tooth 150, 250 or its tooth tip 152, 252 or tooth tip lines 151, 251 extends/extend in the axial direction away from the coupling element 10, 20 or from the tooth root 155, 255. As a result of the tooth 150, 250 or tooth tip 152, 252 which is therefore of particularly narrow configuration (as viewed in the circumferential direction U with regard to the rotational axis A) in the most exposed region of the tooth tip 152, 252 or the tooth tip lines 151, 251, preferably (tapering) acutely, as viewed in the axial direction of the coupling element 10, 20, teeth 150, 250 which lie opposite one another lying on top of one another during the assembly of the coupling elements 10, 20, and therefore faulty assembly, are avoided reliably.

Figure 4A:
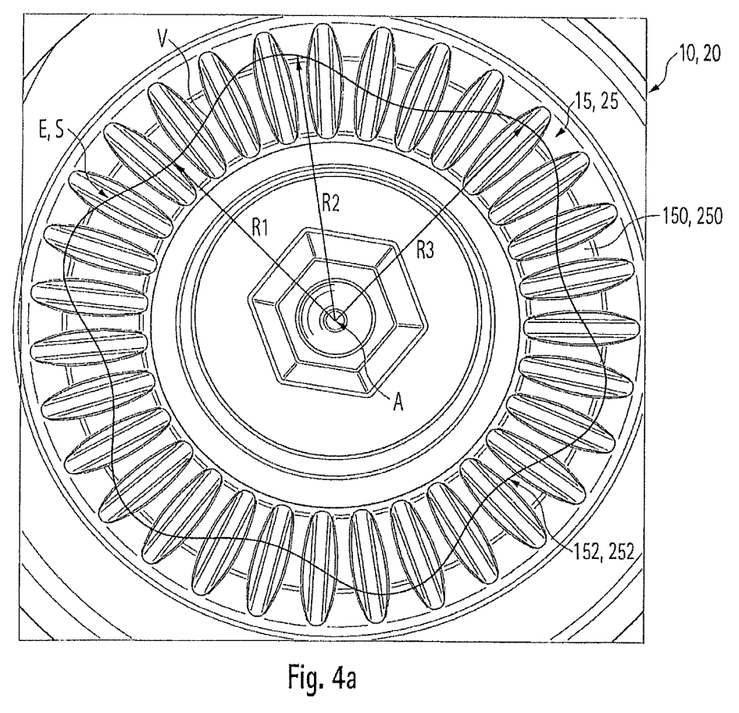
FIG. 4a shows a plan view of a coupling element according to the invention.

FIG. 4a shows a further refinement of a coupling element 10, 20 according to the invention in the plan view of the toothing system 15, 25. According to the refinement which is shown in FIG. 4a, the points of the highest axial extent E and/or the narrowest locations S, which coincide for each tooth 150, 250 in the present, preferred example but can also lie apart from one another, of at least two adjacent tooth tips 152, 252 can preferably be at a different radial spacing R (R1, R2, R3, . . . ) from the rotational axis A. Then, as shown in FIG. 4a, an imaginary connection or connecting line V between the points of the highest axial extent E and/or the narrowest locations S of all the tooth tips 152, 252 with regard to the rotational axis A particularly preferably runs periodically, particularly preferably sinusoidally or in a wave-shaped manner and, furthermore, particularly preferably has a tulip shape or star shape (in the plan view of the toothing system 15, 25). By way of the refinement (shown in FIG. 4a) of the toothing systems 15, 25 of the coupling elements 10, 20, it is made possible in a further simplified manner to provide fully developed toothing tips 152, 252 on both assembly partners (coupling elements 10, 20) on variable diameters.

Figure 4B:
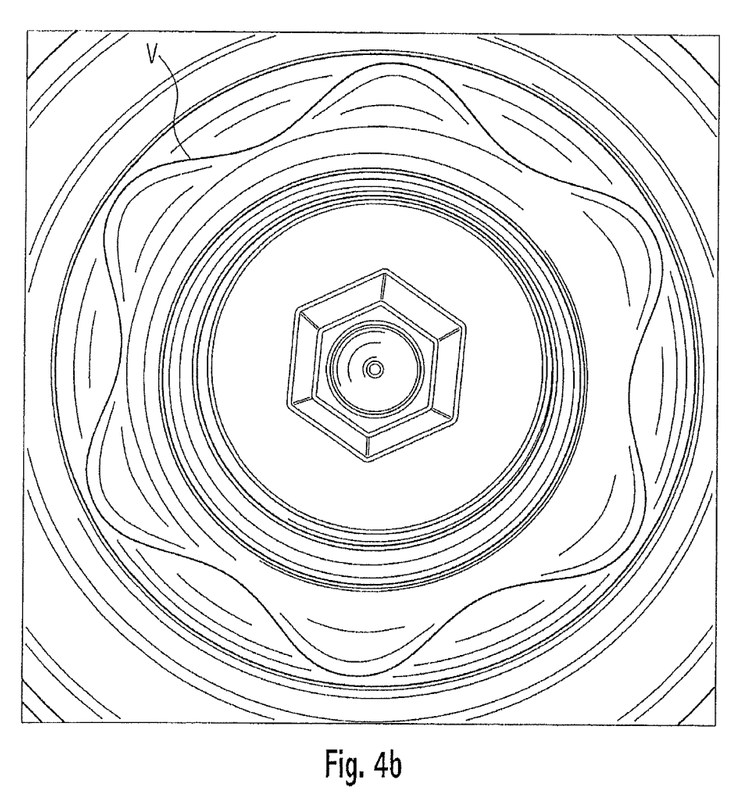

FIG. 4b shows, by way of example, a blank for a coupling element 10, 20 according to FIG. 4a before the teeth 150, 250 have been formed therein. It can be seen that the tulip or star shape in the region of the teeth 150, 250 which are to be formed is already formed in the blank and, as a consequence, the abovementioned imaginary connecting line V between the points which are formed of the highest axial extent E and/or the narrowest locations S which are formed of all the tooth tips 152, 252 results automatically during the introduction of the teeth. FIG. 4a shows the coupling element 10, 20 after the forming of the teeth 150, 250 starting from the blank according to FIG. 4b.

The tooth tip lines 151, 251 of the curved tooth tip 152, 252 preferably have, at the highest axial extent E thereof, a smaller spacing from tooth tip lines 154, 254 of the toothing system 25, 15 which lies opposite than radially on the outside and inside of the highest axial extent E.

According to one preferred refinement, the tooth root lines 154, 254 between two teeth 150, 250 of a coupling element 10, 20 run in the direction toward the rotational axis A, it being possible for the point of intersection of the tooth root lines 154, 254 to lie inside or outside the toothing system 15, 25, preferably in the rotational axis A. As an alternative, the tooth root lines 154, 254 can also be oriented parallel to one another.

In a comparable manner, straight lines G of a tooth 150, 250 which intersect the outermost points radially on the outside and radially on the inside of the tooth tip line 151, 251 likewise preferably run toward one another in the direction of the rotational axis A, it being possible for the point of intersection of said straight lines G to lie inside or outside the toothing system 15, 25, preferably in the rotational axis A. The straight lines G and the tooth root lines 154, 254 of a tooth 150, 250 preferably intersect at the point which preferably lies on the rotational axis A. As an alternative, the straight lines G can also be oriented parallel to one another.

It has already been explained that the invention also includes the coupling element 10, 20 itself. To this extent, reference is made to the full scope of the above comments with respect to the coupling elements 10, 20. A coupling element 10, 20 of this type having a rotational axis A, about which the coupling element 10, 20 can rotate, therefore has a spur toothing system 15, 25 which extends axially with regard to the rotational axis A and is designed in such a way that it can engage into a corresponding toothing system 25, 15 of a second coupling element 20, 10 in order to transmit a torque about the rotational axis A and the first coupling element 10, 20 can be connected with the second coupling element 20, 10 fixedly so as to rotate together. The spur toothing system 15, 25 is configured in such a way that its teeth 150, 250 have tooth tip lines 151, 251 which are curved convexly in the axial direction and away from the tooth root 155, 255. In order to avoid repetitions, reference is made to the above comments for the further, preferred refinement of the teeth 150, 250, in particular of the tooth tips 152, 252 and tooth tip lines 151, 251. The coupling element 10, 20 can be a wheel hub 11 or a rotary joint 21 of a coupling arrangement, in particular of an above-described coupling arrangement 1, with the result that reference can also be made to the above comments in this regard.

The coupling element according to the invention, in particular its toothing system 15, 25, is preferably produced by means of shaping, primary forming and/or material-removing processing methods.

The invention is not restricted to the preceding exemplary embodiments and refinements as long as they are included by the subject matter of the following claims. In particular, the individual features can be exchanged as desired between the exemplary embodiments and refinements.

The invention claimed is:

1. Coupling arrangement having a rotational axis, about which the coupling arrangement can rotate, having:
   a first coupling element with a flat-side spur toothing system which extends axially with regard to the rotational axis and has first teeth which extend radially with respect to the rotational axis,
   a second coupling element with a flat-side corresponding toothing system which extends axially with regard to the rotational axis, engages axially into the spur toothing system, and has second teeth which extend radially with respect to the rotational axis, and
   at least one bracing means for bracing the first coupling element axially with the second coupling element, which coupling elements are fixedly connected to one another so as to rotate together about the rotational axis via the spur toothing system and the corresponding toothing system to transmit a torque,
   wherein at least one of the spur toothing system and the corresponding toothing system is configured in such a way that the first teeth and second teeth have tooth tip lines which are curved convexly in the axial direction away from a tooth root thereof between a radially outermost region and a radially innermost region of a tooth tip, and
   wherein the curved tooth tip is configured to be narrowest at a highest axial extent of the curved tooth tip as viewed in a circumferential direction of the coupling element with regard to the rotational axis.

2. Coupling arrangement according to claim 1, the tooth tip lines of the curved tooth tip being, at a highest axial extent, at a smaller spacing from tooth root lines of the toothing system which lies opposite than radially on the outside and inside of the highest axial extent.

3. Coupling arrangement according to claim 1, the spur toothing system and the corresponding toothing system being of diametrically opposed design.

4. Coupling arrangement according to claim 1, the curved tooth tip being configured to be narrowest at a highest axial extent as viewed in a circumferential direction of a respective one of the first and second coupling elements with regard to the rotational axis.

5. Coupling arrangement according to claim 4, narrowest locations of at least two adjacent tooth tips being at a different radial spacing from the rotational axis.

6. Coupling arrangement according to claim 1, the bracing means being supported axially on one side on the first coupling element, and on another side on the second coupling element.

7. Coupling arrangement according to claim 6, wherein the first coupling element is a wheel hub, and the second coupling element is a joint outer part.

8. Coupling arrangement according to claim 1, the second coupling element having a central threaded bore, into which the bracing means engages.

9. Coupling arrangement according to claim 8, the second coupling element having a central threaded bore, into which the bracing means engages, the bracing means being a threaded bolt which is inserted into a central bore of the first coupling element and is screwed into the threaded bore of the second coupling element and, in a screwed-in-state, is supported axially on a radial supporting face of the first coupling element.

10. Coupling arrangement according to claim 1, the first coupling element being a wheel hub and the second coupling element being a rotary joint.

11. Coupling arrangement according to claim 10, the wheel hub having a wheel flange for connecting a wheel and a sleeve section for receiving a wheel mounting, and the sleeve section having the spur toothing system at its end which faces the rotary joint.

12. Coupling arrangement according to claim 11, the sleeve section being configured integrally with an inner bearing ring of a bearing for a rotatable connection of the wheel hub to the wheel mounting or serving to receive an inner bearing ring of a bearing.

13. Coupling arrangement according to claim 10, the rotary joint being a constant velocity rotary joint which has a joint outer part, a joint inner part, and torque-transmitting elements, the joint outer part having the corresponding toothing system at its end which faces the wheel hub.

14. Coupling arrangement according to claim 13, wherein the torque-transmitting elements are balls.

15. Coupling arrangement according to claim 1, the curved tooth tip having a highest extent in the axial direction between a radially outermost region and a radially innermost region of the tooth tip as viewed in the radial direction with regard to the rotational axis.

16. Coupling arrangement according to claim 15, a point of the highest axial extent of at least two adjacent tooth tips being at a different radial spacing from the rotational axis.

17. Coupling arrangement according to claim 15, the curved tooth tip having the highest extent in a middle of the tooth tip as viewed in the radial direction.

18. Coupling arrangement according to claim 15, an imaginary connection between a point of the highest axial extent of all of the tooth tips with regard to the rotational axis running periodically in a plan view of the corresponding toothing system.

19. Coupling arrangement according to claim 18, the imaginary connection between the points of all of the tooth tips with regard to the rotational axis running sinusoidally or in a wave-shaped manner in the plan view of the corresponding toothing system.

20. Coupling arrangement according to claim 19, the imaginary connection between the points of all of the tooth tips with regard to the rotational axis having a tulip shape or star shape in the plan view of the corresponding toothing system.

21. A first coupling element having a rotational axis about which the first coupling element can rotate, having a flat-side spur toothing system which extends axially with regard to the rotational axis and is designed in such a way that it can engage into a flat-side corresponding toothing system of a second coupling element to transmit a torque about the rotational axis and the first coupling element can be connected with the second coupling element fixedly so as to rotate with one another,
wherein the spur toothing system is configured in such a way that its teeth which extend radially with respect to the rotational axis have tooth tip lines which are curved convexly in an axial direction away from a tooth root thereof between a radially outermost region and a radially innermost region of a tooth tip, and
wherein the curved tooth tip is configured to be narrowest at a highest axial extent of the curved tooth tip as viewed in a circumferential direction of a respective on of the first and second coupling elements with regard to the rotational axis.

22. The first coupling element according to claim 21, wherein the curved tooth tip has the highest extent in the axial direction in a center of a tooth as viewed in a radial direction, points of at least one of the highest axial extent and the narrowest locations of at least two adjacent tooth tips being at a different radial spacing from the rotational axis, an imaginary connection between the points of at least one of the highest axial extent and the narrowest locations of all the tooth tips with regard to the rotational axis running periodically in a plan view of the corresponding toothing system, and the tooth tip line of the curved tooth tip having, at the highest axial extent, a smaller spacing from tooth root lines of a toothing system which lies opposite than radially on an outside and an inside of the highest axial extent.

23. The first coupling element according to claim 21, a respective one of the first and second coupling elements being a wheel hub or a rotary joint of a coupling arrangement.

* * * * *